Aug. 27, 1963 C. B. KREKELER 3,101,933
CUTTER BIT AND SOCKET CONSTRUCTION
Filed Oct. 14, 1957 2 Sheets-Sheet 1
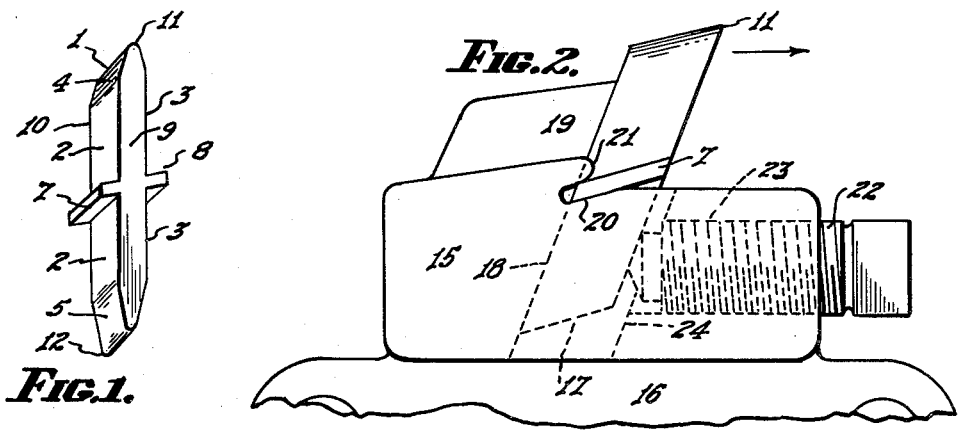
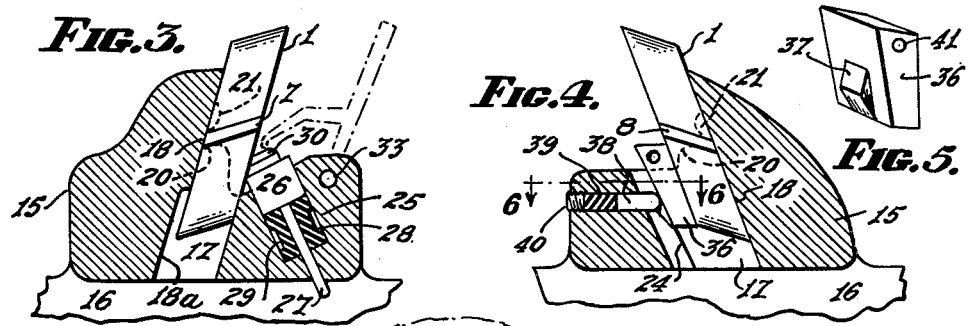
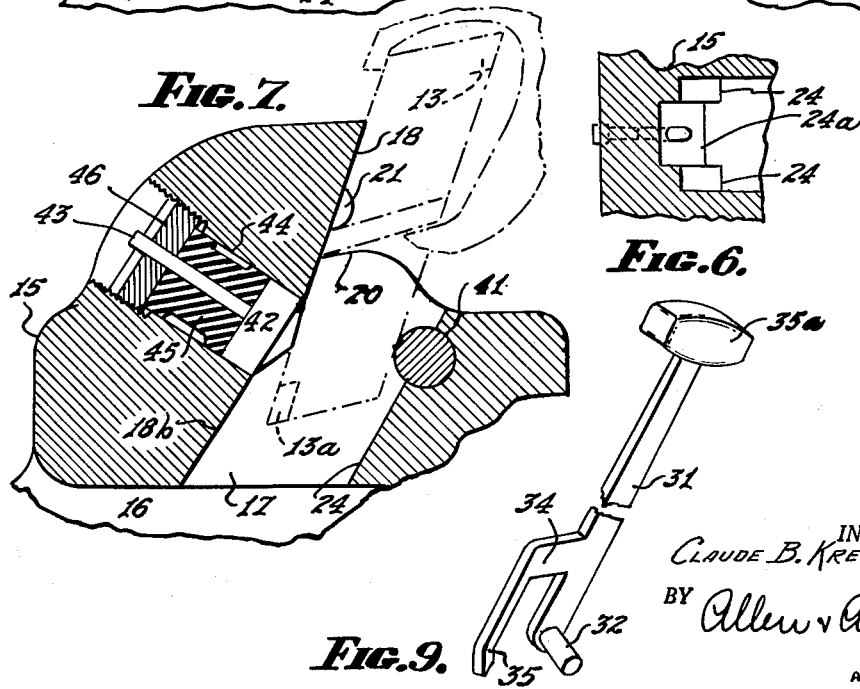
INVENTOR.
CLAUDE B. KREKELER,
BY Allen & Allen
ATTORNEYS.

Aug. 27, 1963  C. B. KREKELER  3,101,933
CUTTER BIT AND SOCKET CONSTRUCTION
Filed Oct. 14, 1957  2 Sheets-Sheet 2
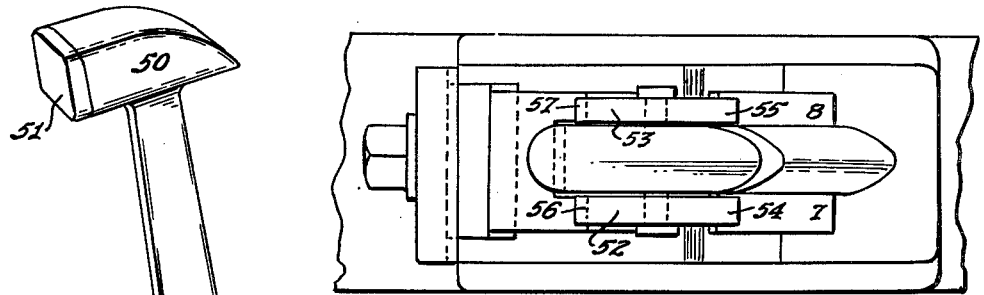
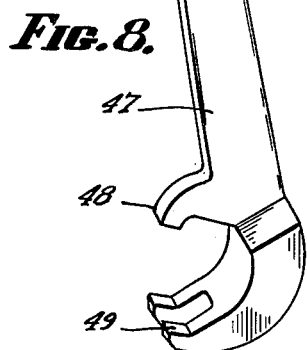
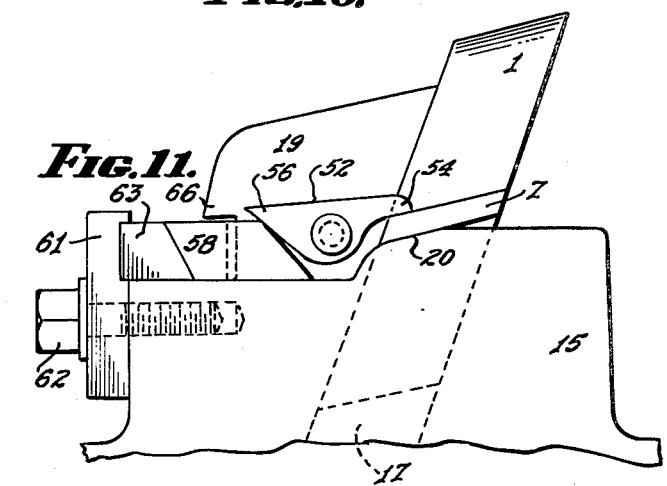
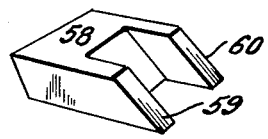
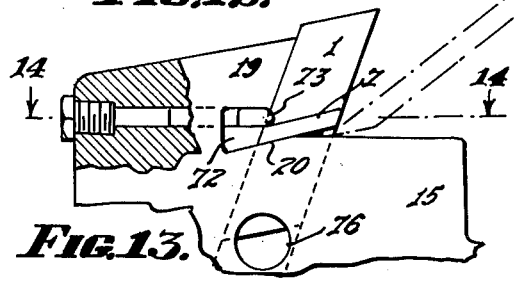
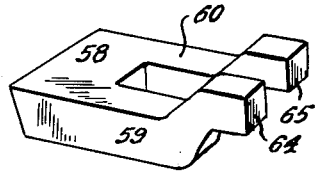
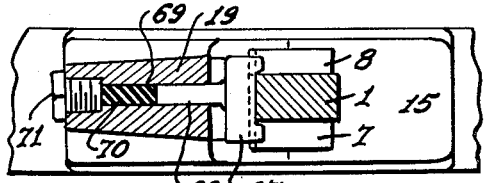
INVENTOR.
CLAUDE B. KREKELER.
BY
ATTORNEYS.

United States Patent Office 3,101,933
Patented Aug. 27, 1963

3,101,933
CUTTER BIT AND SOCKET CONSTRUCTION
Claude B. Krekeler, Cincinnati, Ohio, assignor to The Cincinnati Mine Machinery Co., Cincinnati, Ohio, a corporation of Ohio
Filed Oct. 14, 1957, Ser. No. 690,112
18 Claims. (Cl. 262—33)

The invention has to do with cutting devices such as are used, for example, in mining machinery.

Mine machinery may employ either powered heads or driven chains which carry cutting elements. The powered means is provided with sockets, and the cutting means are directly or indirectly engaged and held in these sockets. Wide use has been made of cutter bits having a head which includes a cutting point and a shank for entry into the socket. Such cutting elments are normally of rather complex formation; they are forgings; and their cost is relatively great. Widespread use has also been made of relatively inexpensive, double-ended cutter bits, which may be made economically from rod-like steel stock which is rolled to a particular contour. Such double-ended cutter bits have, however, required bit holders with head portions which engage and clamp cutter bits, and shank portions which are held in the sockets. While the use of double-ended cutter bits is economical because the bits are relatively low in first cost and when worn at one end so that the cutting point there is no longer usable, may be reversed to provide a new cutting point, the provision of bit holders is a matter of substantial cost.

A fundamental object of this invention is to provide a double-ended cutting bit of inexpensive form which may be engaged directly in a socket member; and to provide a socket member capable of engaging and holding a double-ended bit, which nevertheless is simple in construction, not normally subject to breakage, and with which separate parts in the nature of a bit holder mechanism need not be used.

It is an object of the invention to provide a bit and a socket member of such character that the cutting gauge is fixed and determined by the coaction of the bit and socket member as hereinafter set forth.

It is an object of the invention to provide a structure in which the bit is provided with means for sustaining the cutting thrusts against the socket member.

These and other objects of the invention which will be set forth hereinafter or will be apparent to one skilled in the art upon reading these specifications, are accomplished by that construction and arrangement of parts of which certain exemplary embodiments will now be described. Reference is made to the accompanying drawings wherein:

FIGURE 1 is a perspective view of a type of bit forming part of the present invention.

FIGURE 2 is an elevational view showing a bit engaged in a socket member wherein it is held by means of a set screw.

FIGURE 3 is a longitudinal sectional view of a socket member showing a bit engaged therein and held by resilent means.

FIGURE 4 is a similar sectional view showing a modified structure in which a wedge element is employed.

FIGURE 5 is a perspective view of the wedge element.

FIGURE 6 is a partial transverse sectional view taken along the lines 6—6 of FIGURE 4.

FIGURE 7 is a longitudinal sectional view of a socket member with the bit indicated in dotted lines, and illustrates another manner in which the bit may be held.

FIGURE 8 is a partial perspective view of a bit remover which may be employed with the construction of FIGURE 7.

FIGURE 9 is a perspective view of a tool which may be employed to release the bit in the structure of FIGURE 3.

FIGURE 10 is a top plan view of another construction of socket member.

FIGURE 11 is a side elevation thereof.

FIGURE 12 is a perspective view of a wedge member which may be used in the construction of FIGURES 10 and 11.

FIGURE 12a is a perspective view of another form of wedge member.

FIGURE 13 is an elevational view of yet another form of construction.

FIGURE 14 is a sectional view thereof taken on the section line 14—14 of FIGURE 13.

FIGURE 15 is a perspective view of a locking element used in the construction of FIGURES 12 and 13.

The bit of this invention is shown in an exemplary embodiment in FIGURE 1 and is indicated generally by the numeral 1. It is a bit which may be readily and cheaply manufactured from rolled steel stock in the form of rods. The stock as rolled comprises preferably parallel side faces 2 and 3. The side edges of the rod stock are tapered or chamfered as shown at 4 and 5. The rolled stock otherwise is characterized by lateral ribs 7 and 8 located centrally of the parallel walls 2 and 3.

Bits are formed from such rolled stock by cutting it at intervals with parallel cuts which lie somewhat aslant to the major axis of the rod stock. These parallel cuts provide parallel faces on the bits indicated at 9 and 10. When the individual cuts are so made, the rod stock is divided into a series of the bits illustrated in FIGURE 1, each bit, at the chamfered or tapered portions having a pair of cutting points indicated at 11 and 12. Cutting the rod stock at an angle to its major axis provides for cutting clearance behind the cutting points, as is well understood in the art. The bit in side elevation has a rhomboidal shape as will be evident. After the cutting operations which have been described, the bits may be finished by hardening the steel of which the rod stock is made; but it is within the scope of the invention to hard surface the cutting points by adding some hard alloy such as Carboloy or tungsten carbide to them either in the form of coatings or in the form of insets as diagrammatically illustrated at 13 and 13a in FIGURE 7.

The bits of the present invention may be made in various sizes and with some variation in shape. While this is not a limitation, a typical bit of the invention is approximately 3½ inches in over-all length, the parallel sides 2 and 3 being approximately 2 inches in length, i.e. extending a distance of about ¾ inch to ⅞ inch on either side of the ribs 7 and 8. The particular contour of the beveled or chamfered portions 4 and 5 may be varied to give such shape to the actual cutting point as may be desired.

It is preferred that the side wall elements of the bit 2 and 3 be parallel as hereinabove described since these walls are to be engaged by walls of the perforation of the socket member to prevent tilting of the bit. It is more convenient and less expensive to form the perforation in the socket member with parallel sides. However, it does not depart from the spirit of the invention to provide in the rolled stock side walls 2 and 3 which are non-parallel or otherwise contoured providing the perforation in the socket member is shaped properly to coact with them.

The ribs 7 and 8, it will be noted, have substantial width, and are relatively massive. These ribs perform two primary functions. First, they establish gauge. It has been learned that a set screw alone is not sufficient to retain a double-ended bit against endwise displacement in either direction. The ribs coact with members on the socket element to prevent such endwise displacement. Second, the ribs on the bit serve as a core cutter to protect both the underlying and the overlying clamping means of the socket member as will hereinafter be more fully explained.

Referring to FIGURE 2, there is shown a socket member or block 15. This block may be a part of a driven head or like cutting member. In the particular instance it is shown as part of one of the links of a cutting chain, a side element of the link being partially indicated at 16.

The block or socket element is provided with a perforation 17. This perforation is shaped so as to provide a rear face 18 for engaging the rear edge 10 of the cutter bit, to withstand the primary strains of cutting. The block may be elongated upwardly behind the cutter bit as indicated at 19 to provide additional bearing surface. An arrow in FIGURE 2 illustrates the direction of movement of the block during cutting, and it will be understood that the primary cutting strain is opposite the arrow and is exerted on the cutting point 11 of the bit in rearward and downward directions.

The perforation 17 has side walls adapted to embrace fairly closely the wall portions 2 and 3 of the cutter bit which extend below the ribs 7 and 8 so as to help to prevent lateral tilting of the cutter bit.

The top portion of the socket member is formed as shown at 20 to provide abutments which coact with the ribs 7 and 8 to determine the depth to which the bit can extend into the socket member, thereby establishing gauge, and sustaining the downward cutting thrust. Above the ribs 7 and 8 at each side, the socket member is provided with ears 21 acting to prevent endwise upward withdrawal of the bit so long as the bit is held against the surface 18. The holding device illustrated in FIGURE 2 is a set screw 22 threaded in a longitudinal perforation 23 in the block or socket member and having a conical nose to provide a good bearing against the bit. The front or leading wall 24 of the perforation 17 is spaced a greater distance from the back wall 18 than the width of the bit. Thus with the set screw withdrawn, the bit may be inserted in the perforation of the socket member and brought to lie with its ribs 7 and 8 against the abutments 20 and beneath the ears 21. The set screw can then be tightened. Its primary function is to hold the bit against the surface 18, inward and outward movement of the bit being then prevented by the abutment means 20 and 21.

It will be observed that the forward ends of the ribs 7 and 8 extend upwardly beyond the abutment means 21 in the direction of cutting, and that these ribs have relatively sharp cutting edges. They thus act as core cutters, chipping away any material left by the bit which might otherwise subject the abutment means 21 to undue abrasion. Similarly, they protect the underlying abutment surfaces 20 and adjacent parts of the socket element.

In FIGURE 3 a structure is shown in which the bit is retained in the socket member by resilient means. The socket member is again indicated at 15 and has a perforation with a rear abutment wall 18 against which the rear edge of the bit rests. It is also provided with the abutment 20 and the ears 21 coacting with the ribs 7 and 8. The front portion of the block or socket member is provided with a recess 25 within which operates a plunger member 26 having a guiding rod 27. In the recess behind the plunger member there is located a resilient means 28. This may be a spring or the like, but is preferably a preformed body of resilient substance such, for example, as rubber, natural or artificial, or chloroprene (neoprene). Such a structure is more trouble-free than a spring or the like, particularly in view of the possibility of encountering corrosive mine waters. To facilitate the compression of the resilient substance it may be provided with an annular relief as indicated at 29. The plunger member 26 is provided with a suitable nose 30 for contacting the front edge of the bit and holding the bit snugly against the rear face 18 of the perforation in the socket member.

The bit 1 may be inserted in the socket member 3 by placing it against the rear wall 18 and driving it downwardly, as by means of a copper-nosed or lead-nosed hammer. As it is driven downwardly it will tilt, and the ribs will pass the ears 21 because of their rounded shape, coming to rest beneath them. To permit the tilting of the bit, the rear wall of the socket member is relieved as at 18a. To remove the bit, it must again be tilted so that the ribs can pass the ears 21. This may be accomplished by a tool which engages the bit and forcibly tilts it against the resilience of the element 26; but it is more conveniently accomplished by the use of a tool which depresses the member 26, allowing the bit to be tilted and taken out of the socket by hand. Such a tool is illustrated in FIGURE 9 as comprising a handle element 31 having a laterally projecting pin 32 at its lower end. This pin may be inserted in a hole 33 formed in the block or socket member, so as to provide a fulcrum for the handle. The handle has an arm 34 the end of which is bent laterally as at 35 so that it can engage the nose 30 of the resiliently actuated means 26. By the use of this tool (the position of use being indicated in dotted lines in FIGURE 3), the resilient holding means may be depressed, releasing the bit for tilting and removal.

The tool of FIGURE 9 may be provided on its handle 31 with an integral driving head 35a, which will be faced with lead, copper, bronze or other relatively soft metal or substance.

FIGURES 4, 5 and 6 show a structure in which the bit is held by a wedge. The socket member is again indicated at 15. It has a rear or load sustaining wall 18 in its perforation. The bit 1 lists against this wall with its ribs 7 and 8 engaged below by the abutments 20 and above by the ears 21. A wedge element 36 is inserted between the bit and the front wall 24 of the socket member perforation slants with respect to the rear wall 18 by an angularity which is substantially the same as the taper of the wedge.

It is useful to provide a latching means for the wedge so that accidental dislodgement can be avoided. This is accomplished by providing a latching protuberance 37 on the front face of the wedge. This protuberance is substantially triangular in cross section as shown and is of less width than the wedge itself. To accommodate this protuberance, the front wall 24 of the perforation in the socket member is relieved as most clearly shown at 24a in FIGURE 6. A latching plunger 38 operates in a bore in the front portion of the socket member. Behind it there is a resilient body which may be held in place by a threaded element 40.

In the use of the structure, the bit 1 is placed in position against the socket wall 18 with its ribs engaged between elements 20 and 21. The wedge 36 is next placed in position and driven home so that the protuberance 37 will pass the latching element 38 to prevent dislodgement of the wedge. For the removal of the bit, the wedge may be provided with a perforation 41 in which a tool may be engaged for pulling or prying the wedge out of position.

Another form of structure is illustrated in FIGURE 7. The block or socket member 15 has a perforation 17 which is narrow enough transversely to help maintain the bit against tilting but is elongated in the opposite direction. The perforation is shaped to provide an abutment wall 18 to sustain the thrusts of cutting. Below this wall there is another wall 18b at an angle thereto to permit tilting of the bit. The block is provided with the abutment means 20 and ears 21 for engaging the ribs of the bit as have previously been described.

In the particular embodiment, a hardened pin 41 is fastened in a transverse bore in the block or socket member so as to engage the front edge of the bit when the bit is in position. In lieu of this hardened pin, the front wall 24 of the socket member perforation could have been shaped to provide for this contact.

A resilient means comprising a plunger 42 having a control rod 43 is located in a downwardly slanting bore 44 in the socket member. Behind the plunger 42 there is a body of resilient substance 45 which is held in place by a threaded element 46. The resilient means engages the rear face of the bit and acts to keep the bit tilted against the abutment face 18, the rod 41 acting as a pivot or fulcrum.

To remove the bit, it must be tilted forwardly against the resilient action of the plunger 42. This can be accomplished in various ways as by driving the bit forwardly with a hammer, but is most conveniently accomplished by a tool such as is illustrated in FIGURE 8. This tool comprises a handle 47 at the lower end of which there is an element 48 which will engage the rear edge of the bit, and a downwardly extending bifurcated portion 49, the ends of which will engage beneath the ribs 7 and 8 of the bit. When the tool is in position as shown in dotted lines in FIGURE 7, a forward pull on the handle will tilt the bit so as to release its ribs from the ears 21, and will also tend to draw the bit upwardly and out of the perforation in the socket member. In this operation the rod 41 also acts as a fulcrum. The tool of FIGURE 8 may be provided with a driving head 50 faced with suitably soft material as at 51.

In the structures thus far described, the upper abutment means 21 engaging the bit ribs have been fixed and integral with the socket element, necessitating either a widening of the perforation in the socket member in the front-to-rear direction, or provision for the tilting of the bit. The elements which engage above the ribs to prevent bit withdrawal in the upward direction need not, however, be fixed and integral. In FIGURES 10 and 11 there is shown a structure (like parts being given like index numerals) in which elements 52 and 53 are pivoted at either side of the upward extension 19 of the socket member 15. These elements have forwardly extending noses 54, 55 adapted to engage above the ribs 7 and 8, and rearwardly extending tails 56, 57. A wedge element 58 has two forwardly extending bifurcations 59 and 60 which, positioned on either side of the upward extension 19, underlie the tail portions 56 and 57 of the pivoted elements and cause the noses of these elements to clamp downwardly against the ribs 7 and 8. The wedge 58 may be held in place by an element 61 removably attached to the rear of the socket element, as by one or more bolts 62. It is also possible to insert between the wedge 58 and the retainer 61 a block 63 of resilient material which will act to urge the wedge forwardly against the pivoted elements.

The perforation 17 in the socket member 15 need in this instance have no greater front-to-rear dimension than is necessary to accommodate the bit 1. During bit insertion, the wedge member will be released and the pivoted elements swung out of the way. After insertion the pivoted elements will be brought into clamping relationship as illustrated in FIGURE 11.

In place of the use of pivoted members, the wedge itself may be shaped as illustrated in FIGURE 12a. The forward ends of the bifurcations 59 and 60 are brought upwardly and forwardly as illustrated at 64 and 65, providing noses which will engage above the ribs 7 and 8 and act as clamping means. If the wedge element of FIGURE 12a is resiliently urged to the forward position, it becomes possible by properly shaping the noses 64 and 65 simply to drive the bit 1 into position. For withdrawal of the bit, the wedge element will be released by removal of the member 61 or drawn backwardly against its resilient mounting by a suitable tool. The wedge elements of FIGURES 12 and 12a may be held against upward displacement by an overhang 66 on the rear end of the upward extension 19 of the socket member.

In FIGURES 13 and 14, where, again, like parts have been given like index numerals, a bifurcated element 67 is mounted in the upward extension 19. This bifurcated element is illustrated in FIGURE 15. It has a rearwardly extending control shaft 68 which lies in a perforation 69 in the part 19. The control shaft is backed by a resilient element 70 held in place by a threaded member 71. The part 19 is relieved, as at 72, to accommodate the bifurcated part; but it will be seen from FIGURE 13 that the part 19 is so configured as to prevent upward movement of the bifurcated element 67.

The bifurcated element 67 is provided with forwardly extending nose portions 73 and 74. By properly shaping these nose portions, it is possible to provide a construction in which the bit 1 may be driven into place in the socket member, the ribs 7 and 8 acting to depress the element 67. The bit can be removed from the socket element by the use of a prying tool, as illustrated at 75 in FIGURE 13. It may be removed in other ways also, as by providing the socket member with a transverse perforation 76 into which a drift pin may be driven to engage the lower edge of the bit and move it upwardly until the ribs are disengaged by the noses 73 and 74.

The structures of FIGURES 10, 11, 13 and 14 employ the abutment surfaces 20 underlying the ribs to establish gauge, as hereinabove described.

Modifications may be made in the invention without departing from the spirit of it. The invention having been described in certain exemplary embodiments, what is new and desired to be secured by Letters Patent is:

1. In combination a double-ended cutter bit which is substantially rhomboidal in elevation and is characterized by center, gauge-determining ribs and body portions extending beyond said ribs of sufficient length to be engaged in a socket member to prevent tilting of the bit, and a socket member having a perforation therein to receive a body portion of said cutter bit, one wall of said perforation providing an elongated surface for contacting the rear edge of said cutter bit to sustain the thrust of cutting, said socket member having upper abutments for engaging said ribs to establish gauge and ears adapted to lie above said ribs to prevent endwise withdrawal of said bit when said bit is positioned with its rear edge against said abutment face, the perforation in said socket member being configured to permit forward tilting of said bit to the extent of disengaging said ribs from said ears, and means for retaining said bit with its back edge against said abutment surface.

2. The structure claimed in claim 1 in combination with a tool having a portion for engaging the rear edge of said bit and another portion for engaging beneath the ribs thereof by means of which tool said bit may be forcibly tilted against the resilience of said resilient means and withdrawn from said socket member.

3. The structure claimed in claim 1 wherein said socket member is extended upwardly behind said bit to provide an extension of the said rear face of the perforation therein providing additional support for the rear edge of said bit, and wherein said retaining means is a set screw threaded in a longitudinal perforation in said socket member.

4. The structure claimed in claim 1 in which said retaining means is a resiliently mounted member.

5. The structure claimed in claim 4 wherein said resilient means engages the front edge of said bit.

6. The structure claimed in claim 4 wherein said resilient means engages the back edge of said bit and wherein a fulcrum means engages the front edge thereof.

7. The structure claimed in claim 5 in combination with a tool engageable with said socket member and having a portion acting to depress said resilient means.

8. The structure claimed in claim 5 in combination with a tool engageable with said socket member and having a portion acting to depress said resilient means, said tool having at one end a driving head for said bit.

9. The structure claimed in claim 1 wherein said socket member is extended upwardly behind said bit to provide an extension of the said rear face of the perforation therein providing additional support for the rear edge of said bit, and wherein said retaining means comprises a wedge located between the front edge of said bit and the front edge of said perforation and which is inclined with respect to the rear face thereof by an amount substantially equivalent to the taper of said wedge.

10. The structure claimed in claim 9 in which said wedge has a latching projection, in which the front face of said perforation is grooved to receive said projection, and including a resiliently actuated latch member cooperating with said projection.

11. The structure claimed in claim 9 in which said wedge has a latching projection, in which the front face of said perforation is grooved to receive said projection, and including a resiliently actuated latch member cooperating with said projection, said latching projection being shaped to coact with said latch member to urge said wedge downwardly.

12. In combination a cutter bit having an elongated body of rhomboidal elevational shape and provided with a cutting point at each end, said body being characterized by transverse central ribs, and by body portions extending beyond said ribs of sufficient length to be engaged in an orifice in a socket member to prevent tilting of said bit, said body portions having opposite walls substantially parallel throughout the majority of their lengths, in combination with a socket member having an orifice to accept one of said body portions and retain it against substantial movement in any transverse direction, abutment means at the upper end of said orifice for engaging beneath said ribs to determine gauge, an upward extension on said socket member lying behind said bit and engaging the other body portion thereof, and resiliently acting movable means mounted in connection with said upward extension for engaging above said ribs to prevent upward withdrawal of said bit.

13. In combination, a cutter bit adapted to be engaged directly in a socket member, said cutter bit being substantially rhomboidal in side elevation, characterized by substantially parallel front and rear faces and by side faces, said bit having an elongated body with portions extending both above and below the bit midsection for a sufficient distance that when substantially half of the length of said bit is engaged in a perforation in a socket member conforming at least in part to the side faces thereof, said bit will be held against lateral tilting, said bit having projecting ribs at substantially its midsection of a shape to serve as gauge-determining abutments, and a socket member comprising a body with a perforation therethrough, said perforation having fixed front, rear, and side walls, said rear wall forming an abutment against which the back edge of said bit may rest to sustain the rearward thrusts of cutting, said socket member having abutments adjacent said perforation on which said ribs may rest to determine the projection of said bit from said socket member, and ears overlying the rear ends of said ribs when said bit is positioned with its rear edge against said rear wall to prevent endwise withdrawal of said bit from said perforation, and resilient means acting upon a face of said bit to maintain said bit against said rear abutment wall and to permit relative movement of said bit and said ears transverse the length of said bit whereby said bit may be disengaged from said ears to permit endwise withdrawal thereof from said perforation.

14. In combination, a cutter bit adapted to be engaged directly in a socket member, said cutter bit being substantially rhomboidal in side elevation, characterized by substantially parallel front and rear faces and by side faces, said bit having an elongated body with portions extending both above and below the bit midsection for a sufficient distance that when substantially half of the length of said bit is engaged in a perforation in a socket member conforming at least in part to the side faces thereof, said bit will be held against lateral tilting, said bit having projecting ribs at substantially its midsection of a shape to serve as gauge-determining abutments, and a socket member comprising a body with a perforation therethrough, said perforation having fixed front, rear, and side walls, said rear wall forming an abutment against which the back edge of said bit may rest to sustain the rearward thrusts of cutting, said socket member having abutments adjacent said perforation on which said ribs may rest to determine the projection of said bit from said socket member, and ears overlying the rear ends of said ribs when said bit is positioned with its rear edge against said rear wall to prevent endwise withdrawal of said bit from said perforation, and resilient means permitting disengagement of said ears and said ribs to allow endwise withdrawal of said bit from said perforation.

15. The structure claimed in claim 14 wherein at least a portion of said perforation is elongated in the direction of the front-to-rear dimension of said cutter bit whereby said bit may be moved forwardly in said perforation to permit disengagement of said ribs from said ears.

16. The structure claimed in claim 14 wherein said ears are movable to release said bit.

17. The structure claimed in claim 14 wherein said socket member is extended upwardly behind said bit to provide an extension of the said rear face of the perforation therein providing additional support for the rear edge of said bit.

18. The structure claimed in claim 14 wherein said perforation is elongated in the direction of the front-to-rear dimension of said cutter bit whereby said bit may be moved forwardly in said perforation to permit disengagement of said ribs from said ears, and in which said resilient means is a resiliently actuated member engaging the front face of said bit.

References Cited in the file of this patent

UNITED STATES PATENTS

| | | |
|---|---|---|
| 2,155,526 | Bowman | Apr. 25, 1939 |
| 2,168,794 | Fulke | Aug. 8, 1939 |
| 2,747,852 | Krekeler | May 29, 1956 |
| 2,765,158 | Moehlmann | Oct. 2, 1956 |
| 2,791,414 | Bruestle et al. | May 7, 1957 |
| 2,907,559 | Brown et al. | Oct. 6, 1959 |

FOREIGN PATENTS

| | | |
|---|---|---|
| 754,662 | Great Britain | Aug. 8, 1956 |